(12) United States Patent
Luick

(10) Patent No.: US 7,085,940 B2
(45) Date of Patent: Aug. 1, 2006

(54) FLOATING POINT UNIT POWER REDUCTION VIA INHIBITING REGISTER FILE WRITE DURING TIGHT LOOP EXECUTION

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 10/143,365

(22) Filed: May 9, 2002

(65) Prior Publication Data

US 2003/0212915 A1    Nov. 13, 2003

(51) Int. Cl.
*G06F 1/26* (2006.01)
(52) U.S. Cl. ................. 713/300; 713/323; 713/340
(58) Field of Classification Search ............. 713/300, 713/323, 340
See application file for complete search history.

(56) References Cited

U.S. PATENT DOCUMENTS

| | | | | |
|---|---|---|---|---|
| 4,853,845 A | * | 8/1989 | Zimmer et al. | 713/501 |
| 5,257,214 A | * | 10/1993 | Mason et al. | 708/525 |
| 5,504,925 A | * | 4/1996 | Jeffs | 712/244 |
| 5,818,740 A | * | 10/1998 | Agazzi | 708/313 |
| 6,076,155 A | * | 6/2000 | Blomgren et al. | 712/225 |
| 6,161,208 A | * | 12/2000 | Dutton et al. | 714/764 |
| 6,189,094 B1 | * | 2/2001 | Hinds et al. | 712/222 |
| 6,195,744 B1 | * | 2/2001 | Favor et al. | 712/215 |
| 6,732,259 B1 | * | 5/2004 | Thekkath et al. | 712/233 |
| 2001/0004757 A1 | * | 6/2001 | Miyake et al. | 712/218 |
| 2002/0178350 A1 | * | 11/2002 | Chung et al. | 712/241 |

* cited by examiner

*Primary Examiner*—Lynne H. Browne
*Assistant Examiner*—Tse Chen
(74) *Attorney, Agent, or Firm*—Bockhop & Associates LLC

(57) ABSTRACT

A system and method for reducing the power consumption in a floating point unit of a processor executing an iterative loop of a program by inhibiting floating point register file writes of interim values of the loop from the floating point multiply adder (FPMADD) unit. A plurality of pipeline registers is resident on the processor and holds a portion of an unrolled loop, and once the end of the loop is detected, the last value produced from the loop in the FPMADD unit is written to the floating point registers.

7 Claims, 1 Drawing Sheet

FLOATING POINT UNIT POWER REDUCTION VIA INHIBITING REGISTER FILE WRITE DURING TIGHT LOOP EXECUTION

BACKGROUND OF THE INVENTION

1. Field of the Invention

The present invention generally relates to computer processors. More particularly, the present invention relates to a system and method to reduce the power consumed by the floating point unit of a processor in inhibiting writes to the floating point register during iterations of a loop, such as in scientific computing, and writing only the last value of the loop calculations to the floating point register.

2. Description of the Prior Art

Power conservation is increasingly becoming a concern in both computer systems and processor design. The components of the processor, such as the logic gate transistors, buses and registers, generate heat from their electrical conductance in computer operations. The dramatic increase of chip components on a processor has exacerbated the problems associated with heat generation on the processor, as more components yield more heat during operation.

There have been several attempts in the prior art to alleviate processor power consumption problems. One method is to simply have the processor operate at lower power levels and clock frequency. Another solution has been to create modes within the processor that deactivate system power to components in a computer system when not in use. The processors include power-down circuitry that controls the power delivered to functional units of the processor, and the individual units of the processors have the power cut to them when it is determined that the unit is not necessary during the current operational cycle. However, this system adds to manufacturing costs of the processor, and creates significant overhead in activating and deactivating the units of the processor to affect overall performance of the processor.

One feature provided in state of the art processors is the availability of floating point operations. In early designs, because of processor design complexity, such features were provided via a separate co-processor. In modern processors, such floating-point functionality has been provided in the main processor in a floating point unit. The floating point unit (FPU), also known as a numeric coprocessor, is a microprocessor or special circuitry in a more general microprocessor that manipulates floating numbers more quickly than the basic microprocessor or CPU. The FPU has its own set of instructions that focus entirely on large mathematical operations, such as scientific computing or graphics rendering. The FPU has its own set of floating point registers where normalized floating point operands are read and written by the numeric calculation of the FPU. Most modern processors clock the floating point circuitry, even though no floating point operations are currently executed, or floating point registers used. Both the floating point unit and processor are actuated by micro-code instructions that direct the loading and storing of floating point calculations.

Furthermore, in specific computer programs, a large iterative sequence can reuse the same series of components such that the components can become overheated and damaged from execution of the iterative program. In the example of a Dot Product Loop with an Execution Group of LU: MADD: STU: BC, the instruction cycle from BC→LFDU iterates at each execution of the loop. In numeric intensive computing (NIC), the utilization of the Floating Point Multiply Adder (FPMADD) approaches 100% since the entire FPMADD unit is used each cycle. The modern FPU is a very large unit (64-bit multiply/adder) that at high frequency can dissipate more power than all the other fixed point part of the core. A significant portion of this FPU power is dissipated in the operations to the floating point register file and this power is increasing in current designs for several reasons.

First, the number of registers in the floating point register file (FRF) has grown to as many as 128 or 256 registers for handling software loop unrolling, hardware renaming, multithreading (two sets of registers), VMX (128 128b registers), and other hardware-intensive items, and the register size is likewise increasing to 128 bits. Further, because of high-frequency cycle time pressures caused by the increasing number of physical registers, dynamic logic is usually required for the register file read ports. The power of such a large register file can become a third of the FPU power, which is more than ⅓ of the entire FX unit power if used at 100% utilization, which is a common case in scientific computing. Thus, the power and power density in the FPU are very excessive at clock frequencies above 5 GHz.

It would therefore be advantageous to provide a system and method that can reduce the power consumed in a tight loop of floating point calculations though minimizing unnecessary operations within the floating point unit. Such system and method should be robust and not require significant overhead in processor manufacture or operation. Nor should the system and method unnecessarily operate the circuitry of the processor or co-processor in assisting the floating point unit in the iterative calculations. It is thus to the provision of such a system and method that the present invention is primarily directed.

SUMMARY OF THE INVENTION

The present invention is a system and method for reducing the power consumption in a floating point unit of a processor executing an iterative loop of a program by inhibiting floating point register file writes of interim values of the loop from a FPMADD unit. A plurality of pipeline registers is resident on the processor and holds a portion of an unrolled loop, and once the end of the loop is detected, the last value produced from the loop in the FPMADD unit is written to the floating point register file. It is preferred that the pipeline registers hold at least three unrolled iterations of the loop.

The system particularly includes the processor which has a floating point unit having one or more floating point registers, and at least an FPMADD unit, wherein iterative calculations of each loop of the program are performed in the FPMADD unit, and the processor further has a plurality of pipeline registers for holding a portion of an unrolled sequence of the instructions of an iterative loop. The writes to the floating point register file from the FPMADD unit are inhibited after the initial execution in an iterative loop of the program, and upon the detection of the last calculation of the iterative loop, the last value produced from the loop in the FPMADD unit is written to the one or more floating point registers. Alternately, the system can write the value from the last correctly executed partial iteration of the loop being detected to the one or more floating point registers.

To determine the last execution of the loop, a count register can determine the number of iterations of the loop and assume that after a predetermined number of iterations have occurred, the value should be written from the FPMADD unit to the floating point registers. The inventive method for reducing the power consumption in a floating point unit of a processor includes the steps of performing a first iteration of a loop held within the pipeline registers wherein the iteration produces values at the FPMADD unit, inhibiting writes to the one or more float registers from the FPMADD unit, performing the last iteration of the loop held within the software registers wherein the iteration produces values at the FPMADD unit, detecting the last iteration of the loop, and upon detecting the last iteration of the loop, writing the last value produced from the loop from the FPMADD unit to the one or more floating point registers. At least three unrolled iterations of the loop are preferably held in the pipeline registers. The system can further include a further check of the loop products to insure the presence of a tight scientific loop.

The method further preferably includes the step of counting the iterations of the loop, such as with a count registers, and the step of detecting the last iteration of the loop is detecting the last iteration of the loop based upon a predetermined number of iterations of the loop. And the step of detecting the last iteration of the loop can be detecting the last correctly executed partial iteration of the loop, if so embodied.

The present system and method therefore provides an advantage in that it can reduce the power consumed in a floating point unit during the execution of a tight loop of floating point calculations though inhibiting the writing of interim values from the FPMADD unit to the floating point registers, which minimizes the component usage and power consumption during successive iterations. The system and method are robust and do not require significant overhead in processor manufacture or operation. Further, the method can allow for propagation of values from partially completed iterations of the loop in the case of an interrupt or exception.

Other objects, features, and advantages of the present invention will become apparent after review of the hereinafter set forth Brief Description of the Drawings, Detailed Description of the Invention, and the Claims.

DETAILED DESCRIPTION OF THE INVENTION

Figure 1:
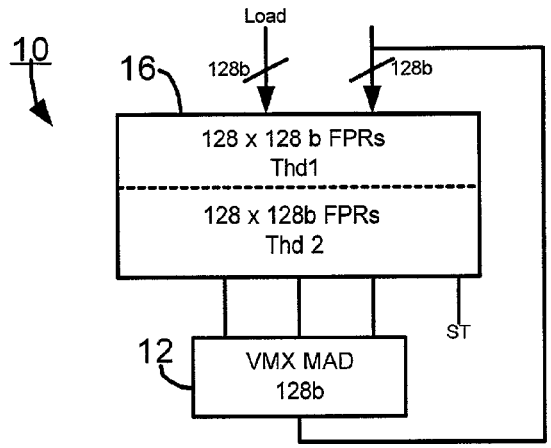
FIG. 1 is a block diagram of a modern floating point unit (FPU).

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

With reference to the figures in which like numerals represent like elements throughout, FIG. 1 is an exemplary floating point unit (FPU) 10 having two sets of 128b registers, and VMX MAD 12 (128b registers). The FPU is on a common processor that includes the FPU and floating point registers 16, and one or more source registers. In FPU 10, 4 read and 2 write ports are required for a single FP unit and 8 read and 4 write ports to support 2 FP units. The present invention allow reduction in overall FPR power consumption during intensive loop processing through recognizing that tight NIC loops follow a strict format type that can be exploited to greatly reduce or even eliminate float register file writes altogether for the inner computational loop.

The float registers are only required in NIC loops (which happens to be the great preponderance of usage) and temporary staging registers are used in the present invention to allow for the sequentiality of the load-FMADD-store loop, and thus, a 1-cycle loop of different iterations of the load-FMADD-store is possible in the staging registers despite their differing latencies and serial dependencies. Instructions are accordingly placed in a series of pipeline registers and the loop is unrolled several times to allow continuous stall-less execution of these variable latency sequences by having the execution units in each cycle working on different iterations of the loop. In a Dot Product example shown in Table 1, with an execution group (EG) of LU: MADD; STU: BC, this requires unrolling three times for a 4 iteration loop and requires 8 registers for targets plus 2 for source constants.

TABLE 1

Unrolled Loop to Avoid Stalls and Holes

| Inner Loop Code | Dependent Targets/Sources | | |
|---|---|---|---|
| LFDU (FR4) | FMADD (FR8) | STFU (FR9) | BC* |
| LFDU (FR5) | FMADD (FR9) | STFU (FR10) | BC* |
| LFDU (FR6) | FMADD (FR10) | STFU (FR11) | BC* |
| LFDU (FR7) | FMADD (FR11) | STFU (FR8) | BC |

Thus, LFDU (FR4)→FPMADD(FR10), and FMADD (FR8)→STFU(FR8). A total of 10 pipeline registers are required to unroll at least three iterations of the loop. In the unrolled loop, any given load target register need only be live for 2 cycles, and any given FMADD target register need only be live for 3 cycles. Except for escape from the loop, the actual state of the FP registers in the loop does not matter because the calculations are of interim values. Consequently, target values are forwarded as required and the floating point registers are only written to on exceptions or end loop cases.

Figure 2:
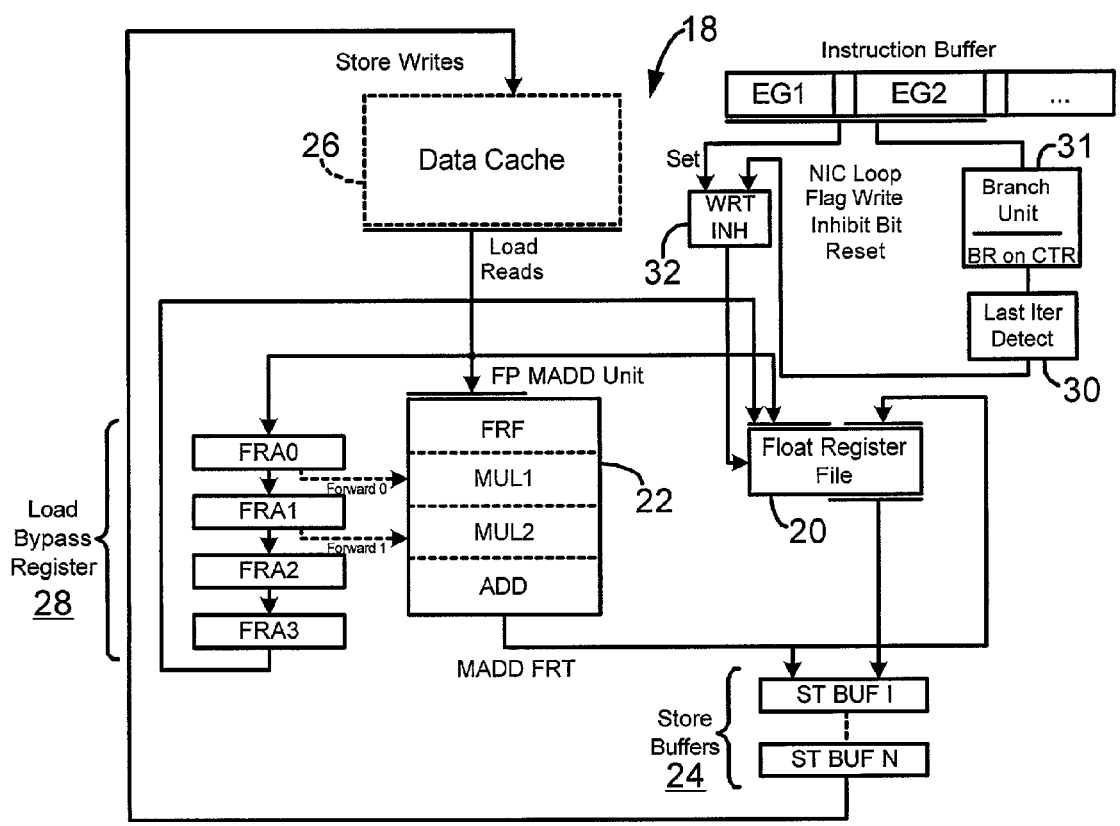
FIG. 2 is a block diagram of the present inventive system for inhibiting a write of a value from the FPMADD unit to the floating point register file until the value of the last iteration of loop has occurred.

As shown in FIG. 2, the system 18 for reducing the power consumption in a floating point unit of a processor has a floating point unit with one or more floating point registers, such as float register file 20, and the processor has a plurality of pipeline registers for holding a portion of an unrolled sequence of the instructions of an iterative loop. The processor also has at least a floating point multiply adder (FPMADD) unit 22, wherein iterative calculations of each loop of the program are performed in the FPMADD unit 22, and writes of the float register file 20 from the FPMADD unit are inhibited after the initial execution in an iterative loop of the program, and upon the detection of the last calculation of the iterative loop, the last value produced from the loop in the FPMADD unit 22 is written to floating point register file 20. A series of store buffers 24 is already required to transport MADD targets to the Data cache 26 to bypass register file reads. On an exception, the floating point register targets in the store buffers 24 are wrapped around to the data cache 26 and written into the floating point register file 20 as required. An analogous series of load target buffers is kept on the load pipe for forwarding load targets on the current instruction, and all instructions following until the load target (FRT) is finally written to the floating point register file 20. Thus, multiple ranks of load bypass registers 28 exist, preferably 4, to allow the bypass of the write operation as all possible load targets needing to be written to establish a correct loop state are available and can be written back to the floating point register file 20 the same as the FMADD targets (above).

The FP MADD Unit can have a further check of the contents to insure that a tight loop is held therewithin. Thus, other circuitry can be provided to detect a multiply-add-store sequence of the tight loop, and if the sequence is not presence, the write inhibit will be blocked and the interim contents written to the floating point registers. In such manner, interim products of the loop will be available to other instructions executing in the loop.

In the system 18, for inner loops as shown in Table 1, the pipeline registers (not shown) assume that load-target-to-MADD and MADD-target-to-store forwarding has been implemented. This common practice reduces the effective latency of the MADD unit and the total loop latency, which reduces the amount of loop unrolling required. Because each load target in the inner loop is used only once and each MADD target is stored as soon as the loop allows (but within only a few cycles), it is unnecessary to write the floating point register file 20 for load and MADD targets, or to read the floating point register file 20 for stores, since all of the loop iterations are only producing transitory results that are all put back to memory. The only cases where the state of the register file must be correct is at the very end of the loop or when any event such as a floating point exception/interrupt occurs which requires the register state to be correct for precise interrupts.

In the tight loop, it is thus only necessary to correctly register the correct state, i.e. the floating point target registers (plus the count register (CTR) and FPSCR) of the very last correctly executed iteration (end loop case) or last correctly executed partial iteration (loop interrupt case).

A preferred method of detecting the end of a loop is to count the iterations of the loop with a count registers, and here a counter register is contained in a branch unit 31 that activates the last iteration detector 30 at the proper count. A loop typically unrolls a binary multiple of times, which is usually four times. Thus in the common loop case, the hardware need only detect that the CTR (count register) is less than four, and then remove the write inhibit 32 at the 4th iteration.

The interrupt situation in the case of loop unrolling may also be simplified from the general precise interrupt requirement since each cycle is executing parts of three iterations at once and the iterations have no interaction with each other. Thus, it is usually sufficient to simply not register any floating point register targets on an exception interrupt and to let software restart the loop at the beginning of this last iteration (the remaining state is still correctly preserved). This is because all store operations from the failing iteration will be nullified before reaching the data cache 26. However, if a loop case were to arise where absolute precision on an exception interrupt is required, the system 18 in FIG. 2 can capture the value of the partial iteration of the loop (last iteration detector 30) and release the write inhibit 32 to allow the value to be written to the floating point register file 20.

It can be seen that the system 18 provides an inventive method for reducing the power consumption in a floating point unit 22 of a processor including the steps of performing a first iteration of a loop held within the pipeline registers wherein the iteration produces values at the FPMADD unit 22, inhibiting writes to floating point register file 20 from the FPMADD unit 22, performing the last iteration of the loop held within the pipeline registers wherein the iteration produces values at the FPMADD unit 22, detecting the last iteration of the loop, and upon detecting the last iteration of the loop, writing the last value produced from the loop from the FPMADD unit 22 to the floating point register file 20. The step of detecting the last iteration of the loop preferably includes the ability of detecting the last correctly executed partial iteration of the loop so that the value of the partial iteration can be preserved in the floating point register file 20.

The method of the system 18 further preferably has the step of holding at least three unrolled iterations of the loop in the load bypass registers 28. Additionally, the method preferably detects the end of the loop with the step of counting the iterations of the loop, such as with a count register, and determines that the loop has executed its last iteration based upon a predetermined number of iterations of the loop.

While there has been shown a preferred embodiment of the present invention, it is to be understood that certain changes may be made in the forms and arrangement of the elements and steps of the method without departing from the underlying spirit and scope of the invention as is set forth in the claims.

What is claimed is:

1. A system for reducing the power consumption in a floating point unit of a processor that includes an instruction buffer and a floating point multiply adder unit, the processor capable of selectively executing iterative loops of a program the system comprising:

a branch unit, responsive to the instruction buffer, that includes a counter register, wherein the branch unit detects execution of an instruction that causes the floating point multiply adder unit to enter a tight loop and wherein the counter register counts each iteration of the tight loop;

a last iteration detector that receives an iteration signal from the counter register in the branch unit indicating whether a last iteration of the tight loop has been executed;

a write inhibitor, responsive to the instruction buffer and to the last iteration detector, that asserts a write inhibit signal when an initial execution in an iterative loop is detected from the instruction buffer and when the last iteration detector has not detected the last iteration of the tight loop, and that does not assert the write inhibit signal when the last iteration detector has detected the last iteration of the tight loop; and a float register that stores a value from the floating point multiply adder unit when the write inhibit signal is not asserted and the does not store the value from the floating point multiply adder unit when the write inhibit signal is asserted, so that the value from the floating point multiply adder unit is stored by the float register only after execution of the last iteration of the tight loop.

2. The system of claim 1, wherein the last iteration detector detects the last iteration of the tight loop based upon a predetermined number of iterations of the tight loop.

3. The system of claim 1, further comprising a plurality of pipeline registers that hold at least three unrolled iterations of the tight loop.

4. A method for reducing the power consumption in a floating point unit of a processor, the processor including a floating point unit having a floating point register, and at least a floating point multiply adder unit, the method comprising the steps of:

detecting execution of an instruction that causes the floating point multiply adder unit to enter a tight loop;

counting each iteration of the tight loop;

inhibiting writes from the floating point multiply adder to the floating point register upon detecting the instruction that causes the floating point multiply adder unit to enter a tight loop and before detecting when a last iteration of the tight loop has been executed; and allowing writes from the floating point multiply adder to the floating point register upon detecting when the last iteration of the tight loop has been executed.

5. The method of claim 4, wherein the step of detecting the last iteration of the loop includes detecting the last correctly executed partial iteration of the loop.

6. The method of claim 4, further comprising the step of counting the iterations of the loop wherein the step of detecting the last iteration of the loop includes counting a predetermined number of iterations of the loop.

7. The method of claim 4, further comprising the step of holding at least three unrolled iterations of the loop in a plurality of pipeline registers.

* * * * *